United States Patent

[11] 3,594,508

[72] Inventor Roger C. Glidden
12 Pleasant, Wenham, Mass. 01984

[21] Appl. No. 851,878
[22] Filed Aug. 21, 1969
[45] Patented July 20, 1971

[54] DATA REPORTING SYSTEM
16 Claims, 4 Drawing Figs.

[52] U.S. Cl. .......... 179/5 R
[51] Int. Cl. .......... H04m 11/04
[50] Field of Search .......... 179/5 R, 90 B

[56] References Cited
UNITED STATES PATENTS 3,284,572 11/1966 Hesselgren .......... 179/5
3,288,933 11/1966 Beeston .......... 179/5

*Primary Examiner*—Kathleen H. Claffy
*Assistant Examiner*—William A. Helvestine
*Attorneys*—Clarence A. O'Brien and Harvey B. Jacobson

ABSTRACT: A motor-driven code wheel programs the supply of electrical energy from telephone lines to the code wheel-driving motor through a switching device to intermittently load the telephone lines during a dialing period producing dialing pulses through the code wheel. The lines are continuously loaded by the motor, an oscillator and a frequency-tuned amplifier during a message period when the output of the oscillator is gated onto the lines through the code wheel. Recycling is stopped when a return signal tone in the lines is recognized by the frequency-tuned amplifier.

Roger C. Glidden
INVENTOR.

BY Clarence A. O'Brien
and Harvey B. Jacobson
Attorneys

Roger C. Glidden
INVENTOR

BY Clarence A. O'Brien
and Harvey B. Jacobson
Attorneys

DATA REPORTING SYSTEM

This invention relates to automatic reporting of monitored conditions through a telephone communication system.

Various automatic-dialing and message-transmitting devices have been proposed for use in commercial telephone communication systems. Many of such prior devices if at all practicable and acceptable by the telephone utility, have required external power supplies and protective devices for the telephone lines. Because of the maintenance and component replacement requirements of such prior devices, they have not been suitable for reporting monitored conditions on a reliable standby basis. Further, many prior art devices were not fully operative in association with all types of telephone communication systems. For example, some automatic-dialing and message-reporting devices are sensitive to voltage polarity reversals that occur across the telephone lines. Contact arcing and brush wear difficulties have also been encountered because of variations in electrical parameters amongst subscribing telephone locations and central exchange equipment used.

An important object of the present invention therefore is to provide a reliable automatic-dialing and coded message-transmitting device for reporting monitored conditions at a subscriber's station through a commercial telephone communication system avoiding many of the aforementioned drawbacks of prior art apparatus.

In accordance with the present invention, an external power supply is eliminated in favor of an arrangement which involves momentary utilization of the electrical energy carried by the telephone lines themselves but without any steady drain of power therefrom during quiescent periods. Further, the apparatus of the present invention is rendered insensitive to voltage polarity reversals and by use of a switching amplifier arrangement, avoids the deleterious affects of slow contact breaking and arcing that have plagued automatic-dialing devices heretofore employed. Thus, the code wheel-driving motor in accordance with the present invention is pulsed to intermittently accelerate the code wheel as well as to load the telephone lines producing the dialing pulses during a dialing period as programmed by the code wheel. During a following message period, the telephone lines are loaded by an increased amount below hangup value by the motor to continue movement of the code wheel and by an oscillator the output of which is gated through the code wheel so as to transmit through the telephone lines, a coded message to a receiving station. A return tone signal originating at the receiving station, is recognized by a frequency tuned amplifier associated with the transmitting apparatus at the reporting station during a final interval in the program cycle of the code wheel to stop recycling of the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
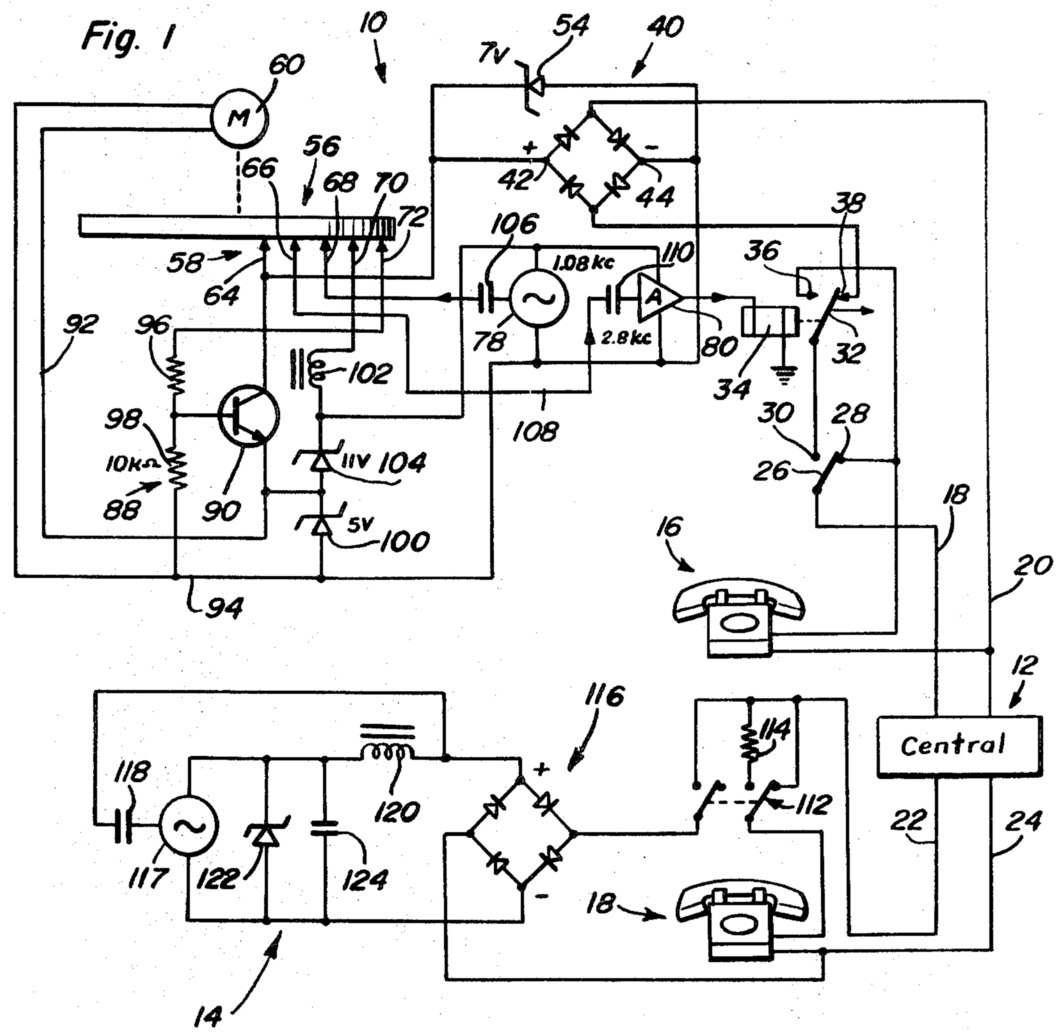
FIG. 1 is an electrical circuit diagram illustrating the system of the present invention.

Referring now to the drawings in detail, FIG. 1 illustrates transmitting apparatus generally referred to by reference numeral 10 at a reporting subscriber's station which is communicatively linked through a central exchange network 12 to receiving apparatus 14 at a subscriber's receiving station. It is contemplated in accordance with the present invention that a plurality of reporting stations will be linked to each receiving station 14 through the central exchange network 12 as part of a commercial telephone system. Accordingly, as shown in FIG. 1, a telephone instrument 16 is connected to the telephone lines 18 and 20 that extend from the central exchange 12 to the reporting station while a similar telephone instrument 18 is connected to the telephone lines 22 and 24 at the receiving station. In the quiescent condition of the transmitting apparatus 10 and receiving apparatus 14, normal telephone intercommunication may be established between the telephone instruments 16 and 18.

FIG. 1 schematically illustrates a condition-sensing device in the form of a switch element 26 through which any condition may be monitored at the reporting station 10 such as fire, temperature, pressure, unauthorized entry, etc. In the quiescent condition of the apparatus with the switch element 26 engaged with contact 28, the telephone instrument 16 is connected across the telephone lines 18 and 20 through the switch element 26 since relay switch 3 associated with a latching relay coil 34, is in its reset position disengaged from contact 36. When the condition-sensing switch element 26 is displaced into engagement with contact 30 in response to the occurrence of the condition to be reported, the telephone instrument 16 will be disconnected from the telephone lines connected through the switch element 26 and the unlatched relay switch 32 engaging contact 38 to one input terminal of a full-wave rectifier 40. The other terminal of rectifier 40 is directly connected to the telephone line 20. Thus, when the transmitting apparatus 10 is activated by displacement of the condition-sensing switch element 26 to its operative position-engaging contact 30, the voltage across the telephone lines and the power transmitted therethrough is transferred to the transmitting apparatus through the rectifier 40. The rectifier renders the transmitting apparatus insensitive to any voltage polarity reversals and the transmitting apparatus will recycle until a relay drive pulse is supplied to the relay coil 34 causing its relay switch 32 to be displaced and latched into engagement with contact 36. The telephone line 18 will then be connected through the actuated condition-sensing switch 26 and latched relay switch 32 to the telephone instrument 16 once again while being disconnected from the transmitting apparatus, to stop its recycling. Thus, the telephone instrument 16 is immediately made available for normal voice communication. The apparatus at the reporting station may then be reset once the monitored condition is restored to normal by returning the switch element 26 to its initial position-engaging contact 28 and manually unlatching the relay switch 32 so that it once again engages contact 38.

Figure 3:
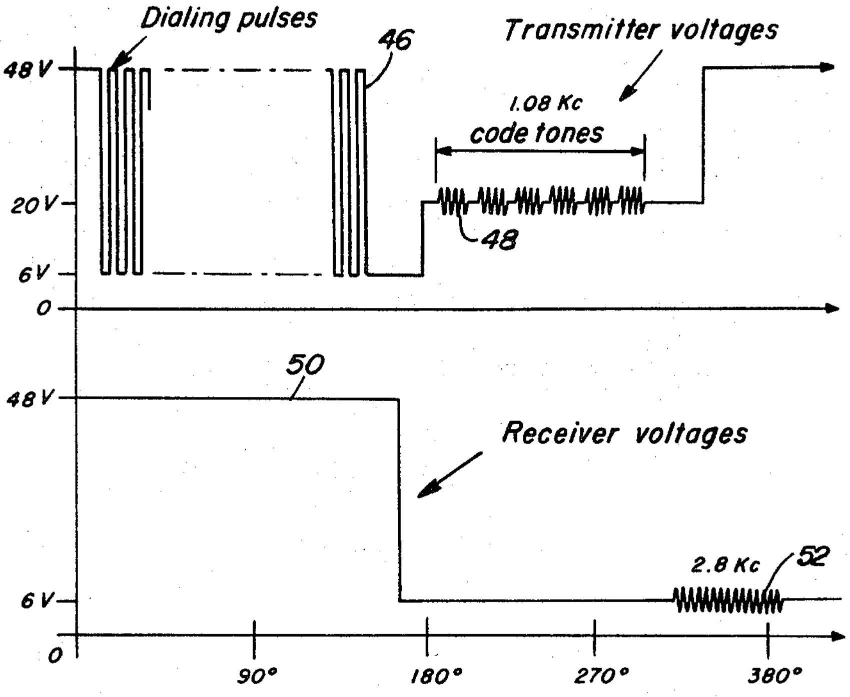
FIG. 3 is a graphical illustration of the transmitter and receiver voltage variations associated with the system of the present invention.

When the transmitting apparatus 10 is activated by connection of the telephone lines to the input terminals of the full-wave rectifier 40, DC power from the positive output terminal 42 and negative output terminal 44 will be available. Further, the telephone lines are loaded through the rectifier 40 by mean of the transmitting apparatus in order to establish the dialing pulses 46 as graphically shown in FIG. 3 during a programmed dialing period. Following the dialing period, the telephone lines are loaded by tone bursts 48 of 1.8 kilocycles, for example, so as to transmit a pulse-coded signal message to the receiving station. It will be observed from FIG. 3, that when the telephone lines at the reporting station are initially loaded by the transmitting apparatus the voltage is dropped from the usual 48-volt value before a dial tone voltage is established across the telephone lines in one typical telephone system. The dialing pulse 46 are produced in order to establish communication with the receiving station. At the end of the dialing period, the voltage across the telephone lines drops to 6 volts, during which time a ringing voltage 50 is established at the receiving station, as shown in FIG 3. When the handset of the telephone instrument 18 at the receiving station is picked up, the voltage at the receiving station drops to 6 volts as shown in FIG. 3. The transmitting apparatus at the reporting station is then programmed for message transmission causing a rise in the voltage across the telephone lines to a 20-volt value under an increased load below hangup value in order to produce the tone burst 48. After the coded message is received, a person at the receiving station may selectively produce through the receiving apparatus 14, a return tone signal 52 of 2.8 kilocycles for example. This return tone signal is recognized by the transmitting apparatus to stop recycling and thereby restore the line voltage across the telephone lines to the 48-volt value. Power to operate the transmitting apparatus is obtained from the telephone lines through the rectifier 40 from which a unidirectional DC output is supplied. Further, a Zener diode 54 having a 7-volt rating is connected across the output terminals 42 and 44 of the rectifier in order to limit the peak signal voltages established by operation of the transmitting apparatus.

Operation of the transmitting apparatus is programmed, the dialing pulses 46 generated and gating of the tone bursts 48 is achieved by means of a code wheel 56 in association with a stationary brush assembly 58. While the code wheel 56 is shown in the form of a disk, it will be appreciated that other movable code elements may be utilized such as cylinders and endless belts. The code wheel is driven by a motor 60 drivingly connected thereto. The motor is energized by a DC voltage supplied from the output terminals of the rectifier 40, to intermittently load the telephone lines during the dialing period and intermittently accelerate the code wheel to produce the dialing pulses as will be explained hereinafter in detail as well as to continuously load the telephone lines during the remainder of the programmed cycle of the transmitting apparatus.

Figure 2:
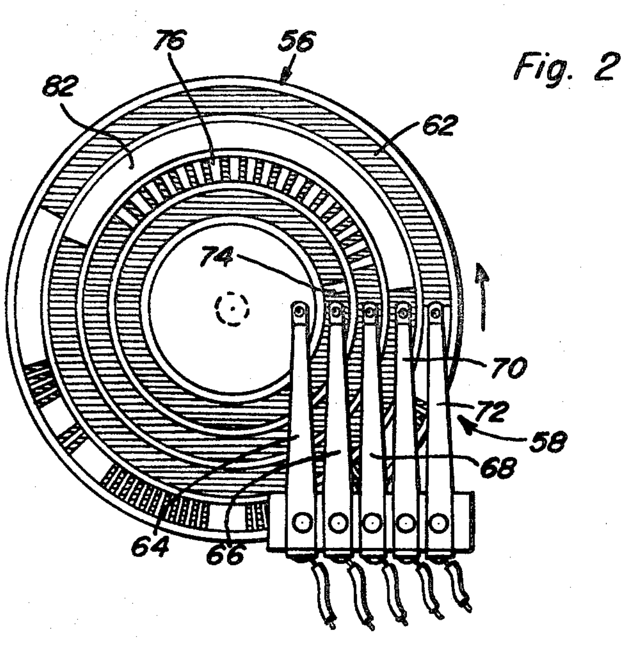
FIG. 2 is a top plan view of the code wheel and brush assembly associated with the apparatus of the present invention.
Figure 4:
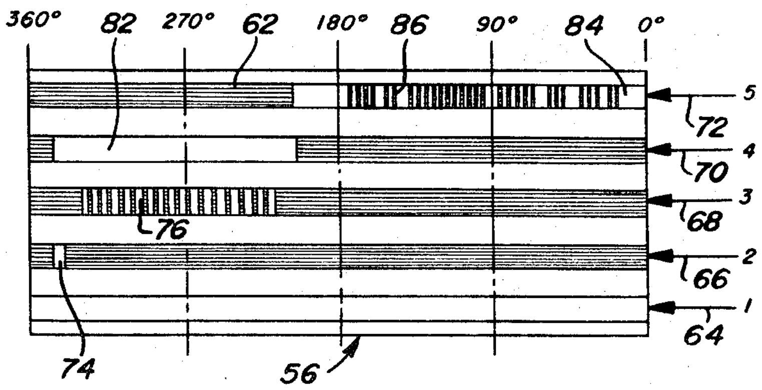
FIG. 4 is a schematic layout of the code wheel and brush assembly shown in FIG. 2.

As shown in FIGS. 2 and 4, the code wheel 56 is provided with a conductive surface, portions of which are covered by nonconductive strips 62 along tracks or paths engaged by the stationary brush contacts 64, 66, 68, 70 and 72 associated with the stationary brush assembly 58. The brush contact 64 is in continuous engagement with the conductive surface of the code wheel during its entire 360° cycle. The brush contact 66 is engaged with the conductive surface portion 74 on the code wheel for a short interval near the end of the programmed cycle for the purpose of receiving the return tone signal 52 from the receiving station and thereby stop recycling of the transmitting apparatus The brush contact 68 controls the gating of the output of an oscillator 78 (FIG. 1) to produce the tone bursts 48. Thus, the brush contact 68 engages the spaced conductive portions 76 on the code wheel surface during a message period between 180° and the return tone signal portion 74. Operation of the oscillator 78 from which the tone bursts 48 are derived and a frequency-tuned amplifier 80 (FIG. 1) through which the return tone signal is recognized, is programmed by means of the brush contact 70 engaging the conductive portion 82 of its track on the code wheel surface following the dialing period in order to supply operating energy to the oscillator and amplifier. Finally, the brush contact 72 engages a conductive portion 84 of its track on the surface of the code wheel during the dialing period, the conductive portion being however interrupted by nonconductive strips 86 to intermittently unload the telephone lines and thereby produce the dialing pulses 46 as aforementioned.

Dialing of the receiving station from the reporting station is regulated through a switching amplifier circuit generally referred to by reference numeral 88 which includes an NPN-type transistor 90 arranged in an emitter follower configuration. The collector of the transistor is directly connected to the positive output terminal 42 of the rectifier while its emitter is connected through conductor 92 to one terminal of the code wheel drive motor 60. The other terminal of the motor 60 is connected by conductor 94 to the negative terminal 44 of the rectifier. Accordingly, when the transistor 90 is switched on, it completes an energizing circuit through the motor 60 to drive the code wheel 56. The transistor 90 is switched on by a forward-biasing signal voltage supplied resistor its base from the brush contact 72 through the resistor 96. A potential difference between the base and the negative voltage line 94 is maintained by the resistor 98 in order to set the forward bias level of the transistor base. Also, the voltage applied to the motor 60 is limited by a 5-volt Zener diode 100 connected across its terminals in order to limit the maximum motor speed.

It will be apparent therefore, that the telephone lines will be rapidly loaded and unloaded by the motor under control of the transistor 90 which is switched on and off by the conductive path intermittently established between the positive terminal 42 of the rectifier 40 and the base of the transistor through brush contacts 64 and 72 and resistor 96 during the dialing period when the brush contact 74 engages the conductive portion 84 on the code wheel surface interrupted by the nonconductive strips 86. Intermittent loading of the telephone lines by the motor will produce the dialing pulses as aforementioned Further, intermittent energization of the motor will accelerate and maintain the code wheel 56 rotating, the code wheel coasting during the nonenergized intervals of the motor. Since loading of the telephone lines is effected through the transistor 90 rather than the brush contacts engaged with the code wheel, the problem of arcing and slow contact breaking is avoided. The brush contacts 64 and 72 merely conduct a very low base current to control switching of the transistor.

At the end of the dialing period, the brush contact 70 engages the conductive portion 82 on the code wheel surface immediately followed by movement of the brush contact 72 onto the nonconductive portion of its track. Thus, forward bias is removed from the transistor 90 and a continuous voltage of lower value is applied across the motor through the inductance coil 102 and the 11-volt Zener diode 104. Voltage is also applied through the inductance coil 102 to the oscillator 78 and the frequency-tuned amplifier 80 in parallel with each other. An increased load is thereby established across the telephone lines, insufficient however to produce hangup. The inductance coil 102 prevents the AC output signal of the oscillator 78 from being loaded by DC components. Further, the output of the oscillator 78 is applied to the telephone lines through the signal-coupling capacitor 106 and the brush contact 68 when engaging the conductive portions of the coded wheel surface establishing a current path through the brush contact 64 to the positive terminal of the rectifier 40. The output of the amplifier is thereby gated as the brush contact 68 engages the spaced conductive portions 76 of the code wheel surface establishing the tone bursts 48 as aforementioned. The number of tone bursts transmitted during the message period of the programmed cycle may form a code identification for the reporting station.

When the position of the code wheel 56 approaches the end of a programmed cycle relative to the stationary brush assembly 58, the brush contact 66 engages the conductive portion 74 so that if a return tone signal appears across the telephone lines at that time, the signal will be conducted from the brush contact 66 through conductor 108 and signal-coupling capacitor 110 to the input of the frequency-tuned amplifier 80. Thus, when a 2.8 kilocycle signal is received by the amplifier 80, an output relay drive pulse is developed which is fed to the latching relay coil 34. When the relay coil 34 is energized by such a drive pulse, it displaces the relay switch 32 to its latched position-engaging contact 36 to thereby disconnect the transmitting apparatus from the telephone lines. The code wheel 56 will then coast past its 0° start position and stop Thus, no braking mechanism is required in connection with the transmitting apparatus.

At the receiving station, the telephone instrument 18 is connected to the telephone lines 22 and 24 through the manual switch 112 in its normal position. Thus, when the receiving station is automatically dialed from a reporting station by the apparatus 10 and a person lifts the telephone handset in response to ringing of the telephone instrument 18, communication is established through the central exchange network 12 with the reporting station. The tone bursts generated by the transmitting apparatus may then be heard during its message cycle and counted in order to identify the location from which the report is being received. If the person at the receiving station is unable to receive the complete coded message or if the receiver handset is picked up too late to receive the complete coded message, the telephone handset may be returned to the instrument cradle before the end of the programmed cycle of the transmitter which will then recycle and thereby give the person at the receiving station an opportunity to receive a report once again. If the person is satisfied with the report, the switch 112 is actuated and momentarily held in its other operative position at the end of the message period to thereby disconnect the telephone instrument 18 from the telephone lines and connect the telephone line 22 through the resistor 114 to one of the input terminals of a full-wave rectifier 116, the other input terminal being directly connected to the telephone line 24. The telephone lines at the receiving station will then be loaded through the rectifier 116 by an oscillator 117 having a 2.8 kilocycle return signal output tone fed to the positive terminal of the rectifier through a signal-coupling capacitor 118. The power terminals of the oscillator 116 are connected across the positive and negative terminals of the rectifier in series with inductance coil 120 so as to avoid loading of the oscillating output signal of the oscillator by DC components. The rectifier itself renders the oscillator insensitive to voltage reversals across the telephone lines. The rectifier also presents a low AC impedance to the signal as DC current is supplied to the oscillator at an input voltage limited by an 18-volt Zener diode 122 in parallel with capacitor 124 to prevent shunting of the output signal from the oscillator Thus, once the return tone signal is generated and applied to the telephone lines in order to stop recycling of the transmitter, the switch 112 may be released in order to restore the connection between the telephone instrument 18 and the telephone lines as well as to disconnect the return tone signal-generating apparatus from the telephone lines. The resistor 114 attenuates the return tone signal 52 applied to the telephone lines at the receiving station.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination with a telephone communication system having message lines across which a voltage is established when loaded at a reporting station, a transmitter including contact means connected to said message lines for programming withdrawal of energy from the message lines, motor means drivingly connected to the contact means for imparting movement thereto, and current-controlling switch means operatively connecting the contact means to the motor means for intermittently energizing the motor means and unloading the message lines to produce dialing pulses during a dialing period.

2. The combination of claim 1 wherein said contact means includes a coded element driven by the motor means and stationary brush means connected to the message lines and engageable with the coded element for conducting current from the message lines to the switch means, said coded element being accelerated by the motor means when energized and coasting while the motor means is momentarily deenergized and the message lines unloaded.

3. The combination of claim 2 wherein said current-controlling switch means includes an amplifier interconnecting the message lines with the motor means when operative, and bias control means interconnecting the contact means with the amplifier during the dialing period for rendering the amplifier operative and imposing a predetermined load on the message lines.

4. The combination of claim 3 wherein said amplifier comprises a transistor arranged in an emitter follower configuration.

5. The combination of claim 4 including an oscillator having an output, loading circuit means rendered operative by the contact means during a message period for connecting the oscillator and the motor means to the message lines to increase the loading thereof below hangup value, said brush means including a gating contact connected to the output of the oscillator conducting a gated signal to the message lines.

6. The combination of claim 5 wherein said circuit means includes inductive means for establishing AC signal components in response to operation of the oscillator during the message period and current-limiting means for reducing current flow through the motor means.

7. The combination of claim 6 including frequency-tuned amplifier means connected in parallel with the oscillator and connected to the circuit means for producing a drive pulse in response to a return tone signal in the message lines and relay means rendered operative by said drive pulse for disconnecting the message lines from the contact means to prevent recycling.

8. The combination of claim 1 wherein said current-controlling switch means includes an amplifier interconnecting the message lines with the motor means when operative, and bias control means interconnecting the contact means with the amplifier during the dialing period for rendering the amplifier operative and imposing a predetermined load on the message lines.

9. The combination of claim 8 wherein said amplifier comprises a transistor arranged in an emitter follower configuration.

10. The combination of claim 1 including an oscillator having an output, loading circuit means rendered operative by the contact means during a message period for connecting the oscillator and the motor means to the message lines to increase the loading thereof, said contact means including a coded element driven by the motor means and stationary brush means connected to the output of the oscillator for conducting a gated signal to the message lines.

11. The combination of claim 10 wherein said circuit means includes inductive means for establishing AC signal components in response to operation of the oscillator during the message period and current-limiting means for reducing current flow through the motor means.

12. The combination of claim 11 including frequency-tuned amplifier means connected in parallel with the oscillator and connected to the circuit means for producing a drive pulse in response to a return tone signal in the message lines and relay means rendered operative by said drive pulse for disconnecting the message lines from the contact means to prevent recycling.

13. The combination of claim 10 including frequency-tuned amplifier means connected in parallel with the oscillator and connected to the circuit means for producing a drive pulse in response to a return tone signal in the message lines and relay means rendered operative by said drive pulse for disconnecting the message lines from the contact means to prevent recycling.

14. The combination of claim 1 including a full-wave rectifier connecting the message lines to the contact means.

15. In combination with a telephone communication system having message lines across which a voltage is established when loaded at a reporting station, a transmitter including contact means connected to said message lines for programming withdrawal of energy from the message lines, motor means drivingly connected to the contact means for importing movement thereto, an oscillator having an output, loading circuit means rendered operative by the contact means during a message period for connecting the oscillator and the motor means to the message lines to increase the loading thereof, said contact means including a coded element driven by the motor means and stationary brush means connected to the output of the oscillator for conducting a gated signal to the message lines.

16. The combination of claim 15 wherein said circuit means includes inductive means for establishing AC signal components in response to operation of the oscillator during the message period and current-limiting means for reducing current flow through the motor means.